United States Patent [19]  [11] Patent Number: 4,745,293
Christensen  [45] Date of Patent: May 17, 1988

[54] METHOD AND APPARATUS FOR OPTICALLY MEASURING FLUID LEVELS

[75] Inventor: Douglas A. Christensen, Salt Lake City, Utah

[73] Assignee: CV Technology, Inc., Dallas, Tex.

[21] Appl. No.: 29,443

[22] Filed: Mar. 23, 1987

[51] Int. Cl.⁴ .............................................. G01F 23/00
[52] U.S. Cl. ................................. 250/577; 250/227; 73/293; 340/619; 356/133
[58] Field of Search .................. 250/577, 227, 237 G; 73/290 R, 323, 327, 293; 356/133; 340/618, 619

[56] References Cited

U.S. PATENT DOCUMENTS

| | | | |
|---|---|---|---|
| 4,134,022 | 1/1979 | Jacobsen | 250/577 |
| 4,443,699 | 4/1984 | Keller | 250/577 |
| 4,589,285 | 5/1986 | Savit | 73/655 |
| 4,644,177 | 2/1987 | Barabino | 250/577 |

OTHER PUBLICATIONS

J. Rakucewicz, "Fiber-Optic Methods of Level Sensing", *Sensors* 5 (Dec. 1986).

*Primary Examiner*—Edward P. Westin
*Assistant Examiner*—Charles Wieland
*Attorney, Agent, or Firm*—Richards, Harris, Medlock & Andrews

[57] ABSTRACT

A non-metallic fiber-optic device is provided for measuring the level of fluid in a tank, reservoir, or other vessel. Light from a broadband light source is transmitted through a fiber optic waveguide and an optical coupler to an optical pipe sensor which is immersed in the fluid to be measured. The optical pipe sensor includes a monotonically varied diffraction grating in the surface and along the length of the sensor which serves to retroreflect wavelengths of light as a function of the local spacing of the diffraction grating. For light entering the sensor from the waveguide, wavelengths of light corresponding to the local spacing of the diffraction grating above the fluid level are retroreflected, whereas wavelengths of light corresponding to the diffraction grating spacing below the fluid level either escape into the fluid, are absorbed, or are coupled to a return fiber to be detected. Either the retroreflected wavelengths of light or the non-retroreflected wavelengths of light are emitted by the sensor, separated by a spectrometer, sensed by a photodetector, analyzed by a computer, and converted to an output display indicating measurement of the fluid level.

26 Claims, 4 Drawing Sheets

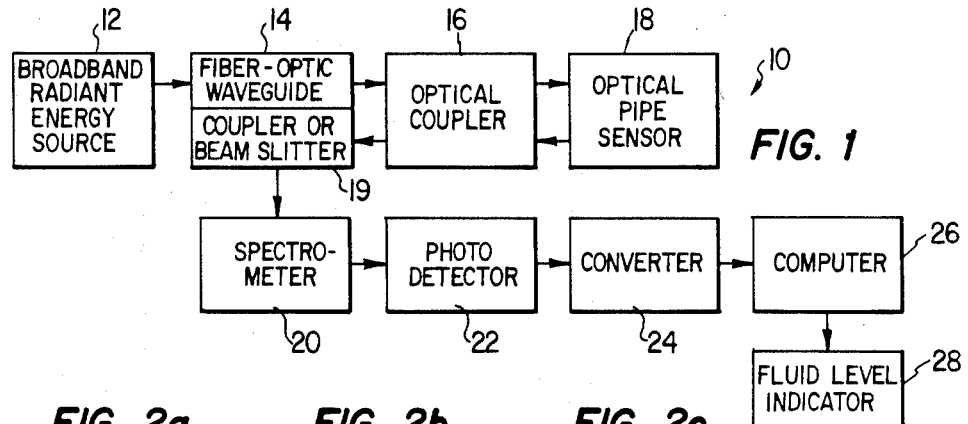
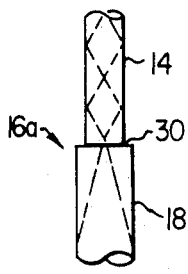 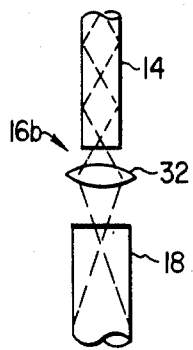 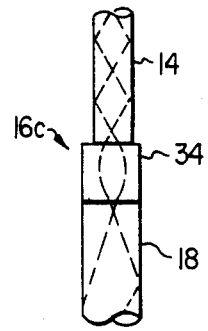
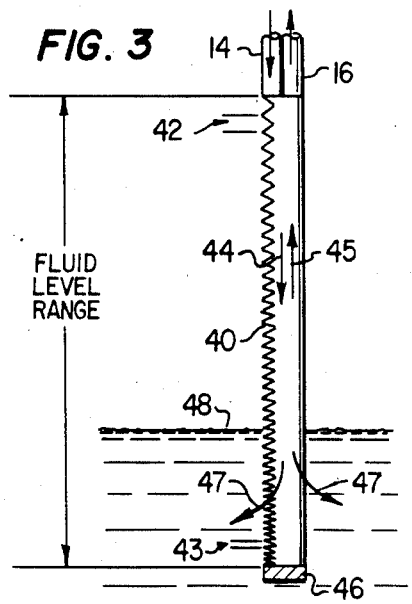 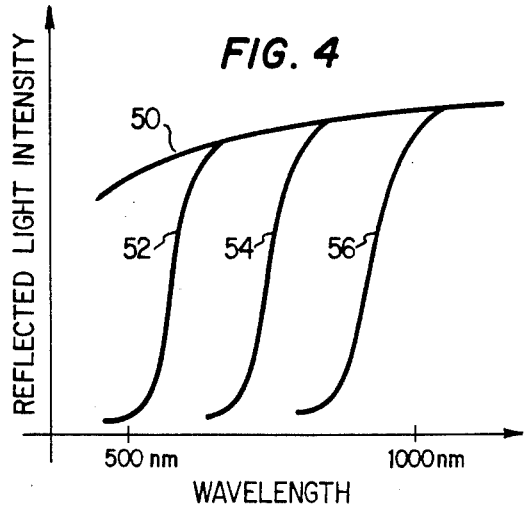

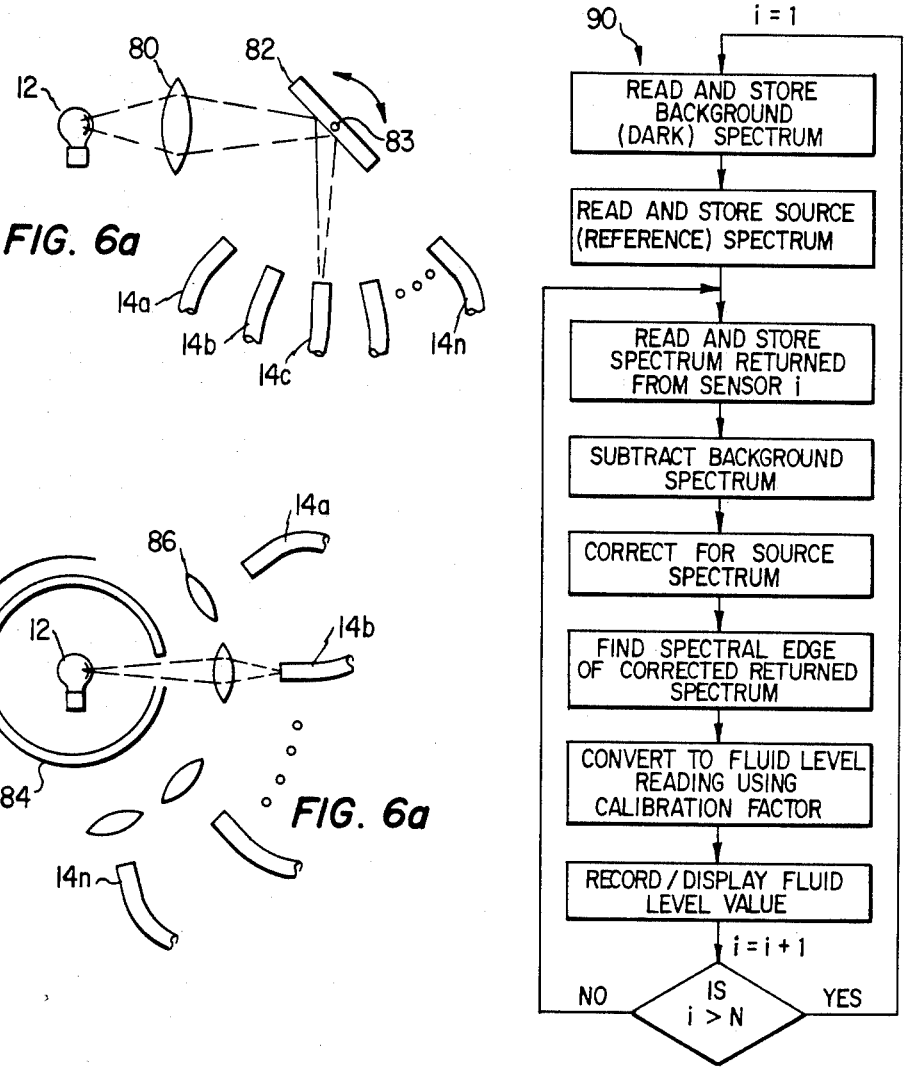

METHOD AND APPARATUS FOR OPTICALLY MEASURING FLUID LEVELS

TECHNICAL FIELD

This invention relates to fiber-optic devices and, in particular, to methods and apparatus for optically measuring the level of fluid in a vessel.

BACKGROUND OF THE INVENTION

Conventional fluid level sensors utilize mechanical, ultrasonic, and/or electrical components to measure and indicate the level of fluid in a vessel. Mechanical methods, such as floats, are susceptible to breakdown and are often bulky in size. Ultrasonic methods require acoustic reflection from the liquid surface and need electrically excited transducers. Electrical techniques, such as resistance or capacitance measurements, employ metallic wires and components immersed in the fluid, which may be undesirable in the presence of corrosive liquids or inflammable fluids where electrical sparks can be hazardous. In such environments it may be advantageous or necessary to use non-metallic components to measure fluid levels. As an example, the measurement of the level of aviation fuel in aircraft fuel tanks may be accomplished more safely with components and cables that do not conduct electricity. Thus, for reasons of safety, accuracy, and reliability, there is a need for a non-metallic device which uses optical energy and non-moving components to measure fluid levels.

The few optical techniques currently available for detecting fluid levels are generally based upon an on/off response at the discrete end of an optical fiber placed in the fluid. In one such typical sensor, light entering the fiber is reflected back from a prism-shaped tip of the fiber if the fluid is below the tip, but the light is transmitted into the liquid (and therefore little is reflected) when the fluid level is above the tip. A serious limitation of this technique is its inability to measure the level of the fluid other than to determine whether it is above or below the fiber tip.

To overcome this limitation, several fibers have been bundled together as described by John Rakucewicz in "Fiber-Optic Methods of Level Sensing," *Sensors*, p. 5 (Dec. 1986). However, this method increases the sensor size, complicates the fluid detection, and is limited to detection of a few discrete fluid levels depending on the number of individual fibers.

Other optical approaches currently being investigated include devices in which the amplitude of light returned from the immersed sensor varies as a function of the level of fluid. These methods usually use narrow-band light (such as from a laser or light emitting diode). However, these amplitudebased devices suffer from inaccuracies caused by instabilities in the light output of the sensor, drift of the detector, and variable losses in the transmitting and receiving fibers. Consequently, onsite calibration and frequent recalibration is often necessary to maintain accuracy of amplitude-based sensors.

Thus, a need has been identified for an optical fluid level sensor that overcomes the deficiencies of amplitude-based optical sensors. In particular, the desired optical sensor should be insensitive to the composition or chemical nature of the fluid being sensed, should be permanently calibrated, and should be unaffected by variations and losses in the intensity of the light.

SUMMARY OF THE INVENTION

The present invention includes methods and apparatus for optically measuring the level of fluids in a vessel without utilizing electrically conducting components. The apparatus includes a source of broadband radiant energy, an optical waveguide such as optical fibers, an optical sensor placed in the vessel so as to extend into the fluid, an optical coupler for joining the waveguide to the sensor, a spectrometer and photodetector for separating and measuring the wavelength spectrum of light returned by the sensor, a computer for analyzing the wavelength spectrum, and a fluid level indicator such as a visual display, a printer/plotter, or an alarm.

The broadband light source for the present invention may comprise, for example, a high-intensity quartz-halogen incandescent lamp. The light from the lamp is focused on the end of the optical waveguide, which may comprise an optical fiber or bundle of fibers, so that the light may be transmitted to the site of the sensor. The optical waveguide may be connected to the sensor by means of a butt coupling, an optical lens, or a graded-index lens.

The optical sensor of the present invention comprises a long, thin optical pipe having a square, rectangular, round, oval, or other cross-sectional area. The optical pipe sensor is placed in the vessel so as to extend the entire range of the fluid level to be monitored. The optical pipe is constructed of material having an index of refraction greater than the index of refraction of the gas or vacuum which is immediately above the fluid to be measured. As a result, light in the pipe above the level of the fluid, where the pipe is surrounded by gas or vacuum, is confined in the pipe by total internal reflection. In an alternative embodiment, the surface of the optical pipe may have a thin cladding layer of a material whose index of refraction is lower than that of the pipe, also resulting in total internal reflection.

The surface of the optical pipe, including any cladding layer if present, is etched or embossed with a diffraction grating whose periodic feature spacing is monotonically varied, or "chirped", from one end of the pipe to the other. The diffraction grating acts as a retroreflector (i.e., reflects light in the opposite direction) for those wavelengths of light which satisfy the condition $\lambda = 2d$, where d is the local spacing of the diffraction grating. Thus, the various wavelengths of light will be selectively reflected by the monotonically varied diffraction grating. Therefore, when the sensor is partially immersed in fluid, the broadband light from the source entering the optical pipe will be largely reflected for all wavelengths corresponding to the spacing of the diffraction grating above the fluid level. However, for all wavelengths corresponding to the spacing of the diffraction grating below the fluid level, the light will not be retroreflected, but will propagate past the level of the fluid in a manner dependent upon the configuration of the sensor.

In one embodiment of the sensor, no cladding layer is employed, and the variable-spacing grating is etched or embossed directly into the surface of the optical pipe. The index of refraction of the optical pipe may be less than or equal to the index of refraction of the fluid. Therefore, in the region below the surface of the fluid, the light traveling within the pipe is not trapped by total internal reflection and is largely lost into the fluid, thus escaping without being retroreflected.

The light retroreflected by the optical pipe returns to the waveguide through the optical coupler. The reflected light may return through the same optical fiber or fibers which transmit the light from the source, or through a separate return optical fiber or fibers. The reflected light is transmitted through the return waveguide, through an optical coupler or beam splitter, and to a receiver comprising a spectrometer. The spectrometer may comprise a diffraction grating or prism for separating the various wavelengths of the reflected light. A photosensor, such as a scanned silicon photodetector array, detects the various wavelengths of light reflected by the optical pipe sensor. The spectrum of the detected light is analyzed by a computer to provide an indication, such as a visual display, a printed record, or an alarm signal, corresponding to the fluid level in the vessel.

It is also possible to construct the optical pipe of a material having an index of refraction slightly greater than that of the fluid. In this case, the power carried by only the higher-order propagating modes within the optical pipe (modes with smaller angles of incidence at the pipe/fluid interface) will be lost below the fluid level, and the power carried by the few lower-order modes will remain trapped and partially retroreflected from the portion of the sensor below the fluid level (although with much less reflection efficiency than for the region above the fluid level since fluid fills the grooves of the diffraction grating below the fluid level). However, by proper arrangement of the coupler which introduces the incident light into the sensor pipe, a predominance of the power carried in the sensor may be apportioned into the higher-order modes, making the difference in intensity between light reflected from above and below the fluid level large enough to allow accurate detection of the level.

In a second embodiment of the sensor, a thin cladding layer is employed on the sensor surface. The index of refraction of the cladding layer is less than that of the sensor core, and is approximately equal to the index of the fluid to be measured. The variable-spacing diffraction grating is etched or embossed directly into the cladding layer, deeply enough so that the core material is exposed inside the grooves to within a thickness less than the evanescent penetration of the totally-reflected wave.

In the gas or vacuum region above the fluid, the diffraction grating formed by the cladding layer retroreflects wavelengths corresponding to the spacing of the exposed grating. However, in the regions of the sensor which lie below the fluid level, the diffraction grating grooves are filled with fluid, and the grating appears more or less optically uniform, since the index of the cladding is approximately equal to the index of the fluid. Thus the grating is rendered non-diffracting for wavelengths corresponding to the grating spacing below the fluid. Thus, the light remains trapped within the submerged sensor section.

Light detection for a sensor having a cladding layer may be achieved by two alternate methods. In one method, an absorber may be fabricated at the far tip of the sensor to absorb all light not retroreflected. Detection of the retroreflected light is accomplished as described above, with the retroreflected light returning along the same path which sends the light from the source to the sensors (either in single or multiple fibers). In the other method, the spectrum of the light transmitted by the sensor, not retroreflected, may be utilized by placing a return fiber (or fibers) adjacent to the sensor. The light remaining after passage through the sensor is collected by optics placed at the tip of the sensor. The transmitted spectrum contains a complement of the information contained in the retroreflected spectrum. That is, wavelengths corresponding to the diffraction grating spacing above the fluid level will be largely absent from the spectrum, while wavelengths corresponding to the diffraction grating spacing below the fluid level will be present.

To prevent the adhesion of a residual film of fluid within the grooves of the diffraction grating (thereby rendering the grating non-retroreflecting in the region of the residual film above the actual fluid level), the sensor may be fabricated from a transparent material that repels the fluid, may be coated with a "fluid-phobic" layer of material on which the diffraction grating is fabricated, or the cladding material, if used, may be made of a substance which repels the fluid.

Because the fluid level sensor of the present invention is based on wavelength changes in the optical spectrum of broadband light reflected from the sensor, it overcomes the deficiencies of amplitude-based sensors described above. In particular, the sensor based on wavelength changes is insensitive to losses and other variations in the intensity of reflected light, and the sensor is permanently calibrated by physically etching the diffraction grating into the sensor.

BRIEF DESCRIPTION OF THE DRAWINGS

For a more complete understanding of the present invention and for further advantages thereof, reference is now made to the following Description of the Preferred Embodiments taken in conjunction with the accompanying Drawings, in which:

FIG. 1 is a block diagram illustrating the primary components of the optical fluid level measurement apparatus of the present invention;

FIGS. 2a, 2b, and 2c illustrate alternative embodiments of the optical coupler between the optical waveguide and the optical pipe sensor of the present invention;

FIG. 3 is a longitudinal cross section of one embodiment of the light pipe sensor of the present invention;

FIG. 4 is a graph illustrating the reflected light wavelength spectrum produced by the sensor embodiment of FIG. 3 for various fluid levels;

FIGS. 6a and 6b illustrate alternative embodiments for time-sharing a common light source with multiple sensors;

FIG. 7 illustrates a spectrometer interfaced with multiple sensors;

FIG. 8 is a logic flow diagram illustrating the process by which the computer determines the fluid level;

DESCRIPTION OF THE PREFERRED EMBODIMENTS

Figure 5A:
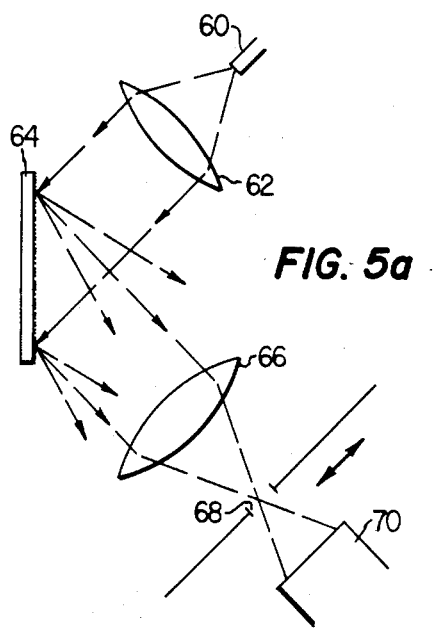
FIGS. 5a, 5b, and 5c illustrate alternative embodiments for scanning the spectrometer to analyze the spectrum of the returned signal.

FIG. 1 is a block diagram of a system 10 illustrating one embodiment of the present invention for optically measuring fluid levels. A broadband radiant energy source 12, such as a quartz-halogen lamp, provides illumination for the fluid level measuring system 10. Light from the source 12 is transmitted through an optical waveguide 14. The waveguide 14 may comprise a single optical fiber or a bundle of optical fibers. The waveguide 14 is connected to an optical pipe sensor 18 by means of an optical coupler 16. The optical pipe sensor 18 reflects light having a wavelength spectrum which is a function of the fluid level being measured. The reflected light returns through the optical coupler 16 and the optical waveguide 14. The reflected light may be transmitted through the same optical fiber or fibers used to transmit light from the source 12, or the waveguide 14 may utilize a separate fiber or bundle of fibers for transmitting the reflected light. The reflected light is routed through a coupler or beam splitter 19 to a spectrometer 20 where the various wavelengths of the reflected light are separated for detection by a photodetector 22. The output of the photodetector 22 is analyzed by means of an analog/digital converter and a computer 26, which generates an output to a fluid level indicator 28. Indicator 28 may comprise a visual display, a printer/plotter, or an alarm signal.

Alternative embodiments of the optical coupler 16 are illustrated in FIGS. 2a, 2b, and 2c. The optical coupler 16a comprises a butt coupler 30. The optical coupler 16a comprises an optical lens 32 interposed between the waveguide 14 and the optical pipe sensor 18. The optical coupler 16c comprises a graded-index lens 34 interposed between the waveguide 14 and the optical pipe sensor 18.

FIG. 3 illustrates one embodiment of the optical pipe sensor 18 mounted in a fluid containing vessel (not shown). The sensor 18 is shown immersed in fluid at a fluid level 48. The sensor 18 is etched or embossed with a diffraction grating 40 on its surface. The diffraction grating 40 extends the length of the sensor 18, which corresponds to the range of the fluid level 48. The spacing of the diffraction grating 40 is monotonically varied, or "chirped", most conveniently as a linear function, from one end of the sensor 18 to the other. In the embodiment shown in FIG. 3, the diffraction grating spacing 42 at the top of sensor 18 is 500 nm and the spacing 43 at the bottom of sensor 18 is 250 nm. The present invention will function equally well with the order of these diffraction grating spacings inverted, with other grating spacings, or with nonlinear grating spacings as a function of distance along the sensor.

The optical pipe sensor 18 is constructed of material having an index of refraction that is less than or equal to the index of refraction of the fluid to be measured. As a result, light from the source 12 in the pipe sensor 18 above the fluid level 48 is confined within the pipe sensor 18 by total internal reflection, as shown by the arrows 44 and 45, whereas light in the sensor 18 below the fluid level 48 largely escapes into the fluid, as shown by the arrows 47. In addition, the sensor 18 may include a light absorber 46 at the bottom of the pipe sensor 18 for absorbing any light in the pipe 18 below the fluid level 48 which does not escape into the fluid.

Sensor 18 may also be fabricated of material with an index of refraction greater than the index of the fluid to be measured. In this case, the light lost onto the fluid below the fluid level will be composed of the higher-order modes of the optical pipe, which may be preferentially fed into the sensor by coupler 16.

The diffraction grating 40 acts as a retroreflector, wherein light from the source 12 is reflected in the opposite direction for wavelengths of light which satisfy the condition $\lambda = 2d$, where d is the local diffraction grating spacing. Therefore, as illustrated in FIG. 3, wavelengths of light corresponding to the 500 nm spacing 42 down to the spacing at the fluid level 48 will be retroreflected as indicated by the arrow 45. The light having wavelengths corresponding to the diffraction grating spacing at the fluid level 48 down to the 250 nm spacing 43 will not be retroreflected and will escape into the fluid or be absorbed by light absorber 46. Thus, the wavelength spectrum of the reflected light will drop essentially to zero intensity at wavelengths corresponding to the spacing of the diffraction grating 40 at the fluid level 48 and below.

FIG. 4 is a graph of light intensity versus the wavelength of the light reflected by the pipe sensor 18. Curve 50 is a plot of a reference signal corresponding to the reflected light received from the pipe sensor 18 in the absence of any fluid. Curve 52 shows the wavelength spectrum when the fluid level 48 is low so that most of the light from the source 12 is retroreflected by the pipe sensor 18. Curve 54 illustrates the wavelength spectrum when the fluid level 48 is at a middle level. Curve 56 illustrates the wavelength spectrum of the reflected light when the fluid level 48 is at a high level so that very little of the light from the source 12 is retroreflected.

Figure 5B:
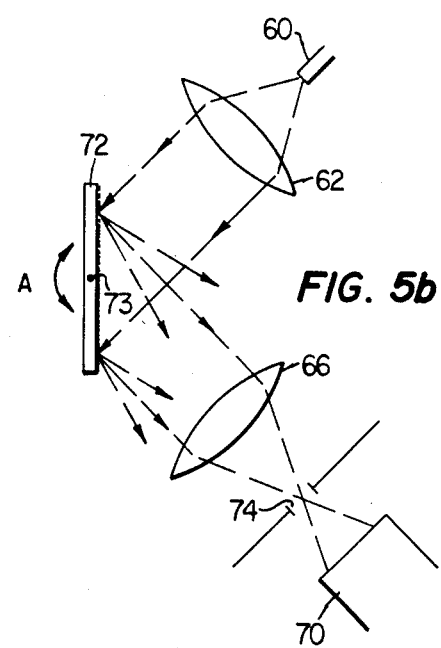
Figure 5C:
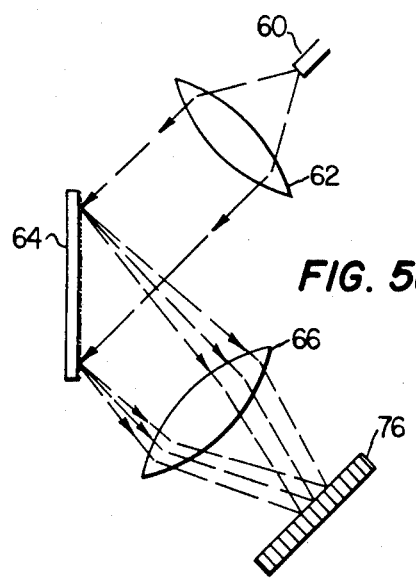

For sensing the wavelength spectrum of the reflected light, the spectrometer 20 may be scanned by one of three alternative methods, as illustrated in FIGS. 5a, 5b, and 5c. The optically dispersive element in the spectrometer which angularly separates the wavelengths of the returned light may comprise a diffraction grating or a prism. FIG. 5a illustrates a fixed diffraction grating or prism 64 illuminated with incoming light from an entrance aperture 60 of the spectrometer 20 after being collimated by a collecting lens 62. The angularly separated spectrum is focused by a lens 66 onto the plane of an exit slit 68. Slit 68 is mechanically scanned to transmit portions of the wavelength spectrum sequentially through the moving slit 68 and onto a single photodetector 70.

A second embodiment of the spectrometer 20 is illustrated in FIG. 5b. As shown in FIG. 5b, the diffraction grating or prism 72 may be rotated about an axis 73 (perpendicular to the plane of the FIGURE) in the direction of the arrow A. This embodiment uses the single photodetector 70, but the exit slit 74 remains stationary.

A third embodiment of the spectrometer is illustrated in FIG. 5c. In this embodiment, the diffraction grating or prism 64 is fixed and portions of the wavelength spectrum are individually detected by separate elements in a linear or rectangular photodetector array 76, such as embodied in an electronically-scanned silicon photodiode array.

Multiple optical sensors may be interfaced to a common source and a common spectrometer by time-multiplexing the source 12 to individual transmitting waveguides leading to separate sensors as illustrated in FIGS. 6a and 6b. In FIG. 6a, the radiant energy from the source 12 is focused sequentially by the lens 80 onto the faces of transmitting waveguides 14a . . . n after reflection from a rotating or oscillating mirror 82. As the mirror 82 rotates about an axis 83 (perpendicular to the plane of the FIGURE), the beam from the source 12 sequentially illuminates each of the sensor waveguides 14a . . . n. The detection of the returned spectrum from each sensor by a common spectrometer is coordinated with the position of the rotating mirror 82. As an alternate embodiment, FIG. 6b illustrates a rotating shutter 84 which allows light from the source 12 to illuminate transmitting waveguides 14a . . . n for only one sensor path at a time. As the shutter 84 rotates, waveguides 14a . . . n are sequentially selected for illumination. Detection of the returned spectrum by the common spectrometer is coordinated with the position of the shutter 84.

An alternative means for interfacing multiple sensors to a common source and a common spectrometer is illustrated in FIG. 7. The return waveguides from a multiplicity of continuously illuminated sensors are arranged as a linear array 88 at an entrance aperture of the spectrometer 20. The returned spectra of the individual sensors are dispersed by the spectrometer 20 in the rectangular coordinate direction perpendicular to the axis of the input array 88, while the waveguides 14a . . . n are located along the rectangular coordinate direction parallel to the input array 88. Thus an m-by-n rectangular photodetector array 76 may unambiguously detect the spectrum returned by each waveguide 14a . . . n.

As described above, the wavelength spectrum of the reflected light is separated by the spectrometer 20, detected by the photodetector 22, analyzed by the analog/digital converter 24 and the computer 26, and converted to a fluid level measurement by the fluid level indicator 28.

Referring to FIG. 8, a logic flow diagram 90 for the computer 26 illustrates a process by which the returned spectrum is analyzed to calculate the fluid level. As shown by the flow diagram 90, the computer 26 can accommodate multiple sensors numbered from i=1 to i=n. The computer 26 first reads and stores a background spectrum corresponding to the dark level of the photodetector 22. Next, the computer 26 reads and stores a reference spectrum characteristic of the source 12. During operation of the system 10, the returned spectrum from sensor i is read and stored after correction for the background and source spectra. The computer 26 then determines the spectral edge corresponding to the cutoff of light reflection by the sensor/liquid interface at the fluid level 48. This calculation is converted to a reading of absolute fluid level by a previously determined and stored calibration factor, and the fluid level value is displayed and/or recorded by the indicator 28. If multiple sensors are employed, the process continues by incrementing the value of i as shown until all sensors are read and displayed, whereupon the cycle begins again with a reading of the background spectrum. All of the above steps, however, are not necessary to the present invention; for example, correction for the source spectrum may not be needed in many applications.

Figure 9A:
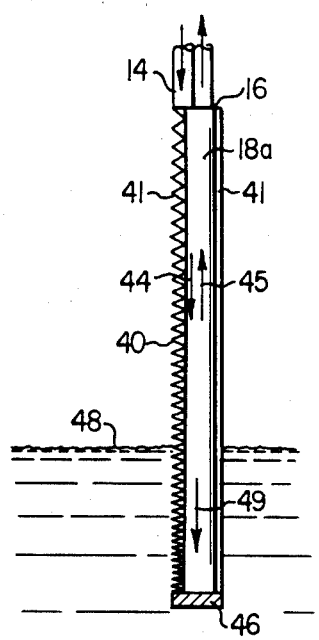
FIGS. 9a and 9b illustrate alternative embodiments of the light pipe sensor of the present invention.

Referring to FIG. 9a, an alternate embodiment of the sensor 18a is illustrated wherein the diffraction grating 40 is etched or embossed into a thin cladding layer 41. The spacing of the diffraction grating 40 is monotonically varied in a manner similar to that illustrated in FIG. 3, and the depth of the grooves of the diffraction grating reach essentially to the surface of the sensor's core (to at least within an evanescent depth of the light in the sensor 18a). The index of refraction of the cladding layer 41 is lower than that of the core, and approximately matches that of the fluid. Incident light propagating down the sensor in the direction of arrow 44 and having wavelengths corresponding to the spacing of any portion of the grating 40 above the fluid level 48 is largely retroreflected, as indicated by the direction of arrow 45. Below the level of fluid 48, the diffraction grating 40 is rendered non-reflecting by the index-matching action of the fluid filling the grating grooves, and the remaining light is trapped and continues down as indicated by arrow 49 to be absorbed at the tip of the sensor by absorber 46. The spectrum of light retroreflected has the same spectral features as illustrated in FIG. 4.

Figure 9B:
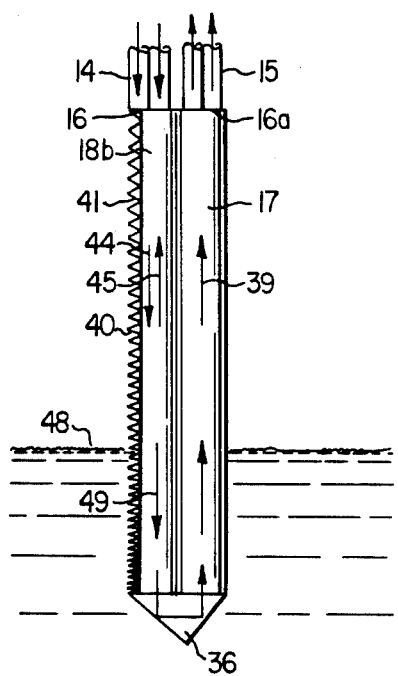

FIG. 9b illustrates an alternative embodiment for collecting the spectrum of light from sensor 18b whose diffraction grating 40 is etched or embossed into the thin cladding layer 41. The light wavelengths corresponding to the grating spacing above the fluid level 48 are retroreflected in the direction of arrow 45, while the light wavelengths corresponding to the grating spacing below the fluid level 48 are not retroreflected and continue propagating in the direction of arrow 49. At the tip of the sensor 18b, optical component 36 (such as a prism, for example) collects the transmitted light and returns it in the direction of arrow 39 via waveguide 17 and coupler 16a to receiving waveguide 15. Waveguide 15 then transmits the light to the spectrometer 20.

Figure 10:
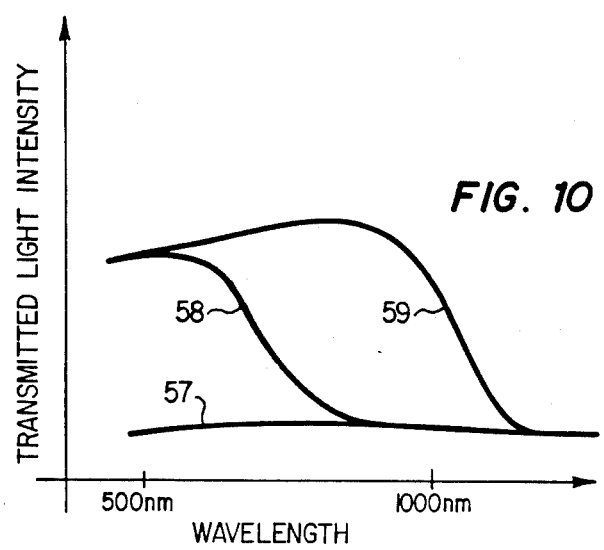
FIG. 10 is a graph illustrating the wavelength spectrum transmitted by the sensor embodiment of FIG. 9b for various fluid levels.

FIG. 10 is a graph of the spectrum of the light transmitted by the sensor 18b of the embodiment illustrated in FIG. 9b. Curve 57 is a plot of a reference signal corresponding to the transmitted light received from sensor 18b in the absence of any fluid. Curve 58 shows the transmitted wavelength spectrum when the fluid level 48 is low so that most of the light from the source is retroreflected by the sensor 18b and little is transmitted. Curve 59 illustrates the transmitted spectrum when the fluid level is high so that little of the light is retroreflected and most is transmitted to the spectrometer 20.

Since the fluid level sensor of the present invention measures the wavelength characteristics of the reflected light rather than the intensity of the reflected light, the present invention is insensitive to light intensity variations caused by the light source 12, the waveguide 14, the optical coupler 16, or other components of the system. Also, within broad limits, the optical fluid level sensor of the present invention is insensitive to the exact index of refraction of the fluid being measured. Furthermore, calibration of the fluid level with respect to the reflected wavelength spectrum is a permanent part of the sensor layout, so there will be no drift and no need for periodic recalibration of the system. This assumes that the wavelength stability of the spectrometer 20 does not change, which is generally a valid assumption for diffraction gratings and prisms.

Whereas the present invention has been described with respect to specific embodiments thereof, it is apparent that various changes and modifications may be suggested to one skilled in the art and it is intended that this invention encompass such changes and modifications as fall within the scope of the appended claims.

I claim:

1. A fluid level measuring apparatus, comprising:
a broadband radiant energy source;
an elongate sensor having a length immersible in the fluid;
a means for transmitting radiant energy from said source to said sensor;
said sensor including means for converting said broadband radiant energy to a radiant energy wavelength spectrum functionally related to the length of said sensor immersed in the fluid;

means for receiving said radiant energy wavelength spectrum; and means for converting said radiant energy wavelength spectrum into an indication of the fluid level.

2. The fluid level measuring apparatus of claim 1, wherein said radiant energy is light energy.

3. The fluid level measuring apparatus of claim 2, wherein said source comprises a quartz-halogen incandescent lamp.

4. The fluid level measuring apparatus of claim 1, wherein the means for transmitting radiant energy comprises a waveguide.

5. The fluid level measuring apparatus of claim 4, wherein said waveguide comprises at least one optical fiber for transmitting radiant energy in the form of light.

6. The fluid level measuring apparatus of claim 1, wherein said elongate sensor comprises an optical pipe sensor.

7. The fluid level measuring apparatus of claim 1, wherein said means for emitting radiant energy comprises a diffraction grating along the length of said elongate sensor.

8. The fluid level measuring apparatus of claim 7, wherein said diffraction grating has a spacing monotonically varied along the length of said elongate sensor.

9. The fluid level measuring apparatus of claim 8, wherein said emitted radiant energy comprises wavelengths retroreflected by said diffraction grating above the fluid level.

10. The fluid level measuring apparatus of claim 8, wherein said emitted radiant energy comprises wavelengths transmitted by said sensor and not retroreflected by said diffraction grating above the fluid level.

11. The fluid level measuring apparatus of claim 1, wherein said means for receiving said emitted radiant energy comprises a return waveguide coupled to said elongate sensor.

12. The fluid level measuring apparatus of claim 11, wherein said return waveguide comprises at least one optical fiber for transmitting radiant energy in the form of light.

13. The fluid level measuring apparatus of claim 1, wherein said means for converting said radiant energy wavelength spectrum comprises a spectrometer for separating said wavelength spectrum and a detector for sensing said separated wavelength spectrum.

14. The fluid level measuring apparatus of claim 13, wherein said means for converting said radiant energy wavelength spectrum further comprises a computer and an analog/digital converter for converting said sensed wavelength spectrum into an indication of the fluid level.

15. The fluid level measuring apparatus of claim 13, wherein said radiant energy comprises light and said detector comprises a photodetector.

16. The fluid level measuring apparatus of claim 13, wherein said spectrometer comprises:
a lens for collimating the separated wavelength spectrum;
a single photodetector for detecting the collimated spectrum; and
a slit interposed between said lens and said photodetector and movable perpendicular to the collimated spectrum to transmit portions of the spectrum sequentially to said photodetector.

17. The fluid level measuring apparatus of claim 13, wherein said spectrometer comprises:
a lens for collimating the separated wavelength spectrum;
a single photodetector for detecting the collimated spectrum; and
a rotatable means for separating said wavelength spectrum, wherein rotation of said rotatable means causes successive portions of said wavelength spectrum to be directed sequentially onto said lens for detection by said photodetector.

18. The fluid level measuring apparatus of claim 13, wherein said detector comprises a photodetector array for detecting said separated wavelength spectrum.

19. An optical fluid level measuring apparatus, comprising:
a broadband light source;
an elongate optical pipe sensor having a length immersible in the fluid;
fiber-optic means for transmitting light from said source to said sensor;
said sensor including a diffraction grating along its length for separating and emitting light from said sensor having a wavelength spectrum functionally related to the length of said sensor immersed in the fluid;
fiber-optic means for receiving and transmitting said emitted light;
a spectrometer for separating said transmitted emitted light into its wavelength spectrum;
a photodetector for producing an output as a function of the sensed wavelength spectrum; and
a computer processor for receiving said output from said photodetector and converting said output into an indication of the fluid level.

20. The optical fluid level measuring apparatus of claim 19, wherein said diffraction grating has a spacing monotonically varied along the length of said sensor.

21. The optical fluid level measuring apparatus of claim 20, wherein said diffraction grating is etched or embossed in a cladding layer formed on said sensor.

22. The optical fluid level measuring apparatus of claim 20, wherein said emitted light comprises wavelengths retroreflected by said diffraction grating above the fluid level.

23. The optical fluid level measuring apparatus of claim 20, wherein said emitted light comprises wavelengths transmitted by said sensor and not retroreflected by said diffraction grating above the fluid level.

24. The optical fluid level measuring apparatus of claim 19, further comprising an optical coupler disposed between said fiber-optic means and said sensor.

25. A method of measuring a range of fluid level variation, comprising the steps of:
transmitting broadband radiant energy through a waveguide;
coupling an elongate sensor to said waveguide for receiving said broadband radiant energy;
positioning said sensor in the fluid so as to extend the range of the fluid level variation to be measured;
emitting a wavelength spectrum of radiant energy from said sensor functionally related to the level of fluid surrounding said sensor; and
detecting and converting said emitted wavelength spectrum into an indication of the fluid level.

26. The method of claim 25, further comprising the step of:
providing a diffraction grating on said sensor, said grating having monotonically varied spacing along the length of said sensor.

* * * * *